3,549,720
SELECTIVE HYDROGENATION OF ACETYLENES AND CATALYST THEREFOR
James H. Wright and Cecil B. Hogg, Louisville, Ky., assignors to Catalysts and Chemicals Inc., Louisville, Ky., a corporation of Delaware
No Drawing. Continuation-in-part of application Ser. No. 584,664, Oct. 6, 1966. This application July 22, 1969, Ser. No. 843,855
Int. Cl. C07c 5/08; B01j 11/08
U.S. Cl. 260—677                               6 Claims

ABSTRACT OF THE DISCLOSURE

Palladium hydrogenation catalysts are known in the art and they have been especially effective for the hydrogenation of acetylenes in a gas stream containing olefins. Palladium catalysts employed in this selective reaction must possess a special set of properties in order to be completely effective. Thus one catalyst so used has a low surface area and a specific, narrow, mean pore radius. A catalyst suitable for such selective hydrogenation reactions is provided herein which does not have these properties. The catalyst has a major quantity of pores with diameters smaller than 800 angstrom units, the carrier being predominantly alumina. The carrier has the palladium uniformly distributed throughout. The catalyst must have a surface area above 80 square meters per gram.

BACKGROUND OF THE INVENTION

This application is a continuation-in-part of Ser. No. 584,664, filed Oct. 6, 1966 now abandoned.

This invention is directed to solid catalysts, particularly to improved selective hydrogenation catalysts wherein palladium is used with an alumina carrier. Catalysts prepared according to this invention are especially useful for the hydrogenation of acetylenes, especially the hydrogenation of acetylenes from a stream containing olefins.

Palladium hydrogenation catalysts are known in the art, and they have been prepared in numerous ways, such as by impregnating an absorbent support with the noble metal salt solution and then evaporating the solution of said salt in the presence of the support. Another method involves the precipitation of palladium hydroxide in the presence of an inert support by adding a palladium chloride solution to a hot solution of sodium carbonate in which the support is suspended. Another procedure is to add the carbonate to the palladium chloride solution. Catalysts prepared by these known methods are active hydrogenation catalysts, but since their use does not result in high hydrogenation rates when used with low concentration feeds, they are not completely effective.

A wide variety of supports has been used in catalysts for the selective hydrogenation of acetylenes, especially supports normally used in catalyzing other hydrogenation reactions. Examples are diatomaceous earth, such as kieselguhr and other siliceous materials; inorganic salts, such as barium sulfate: and carbonaceous materials, such as activated carbon. Large quantities of alumina are used as supports for noble metal hydrogenation catalysts, particularly as supports for palladium catalysts. However, it is now recognized that physical properties of the various aluminas, such as surface area, pore size, or pore size distribution and the like, should fall within narrow ranges for various reactions. For example, when selectively treating a particular size range molecule it is often advantageous to have a particular alumina pore size. A particular surface area has advantages under certain circumstances, and disadvantages under others. Thus, U.S. 3,113,980 relates to catalysts for the selective hydrogenation of acetylenes in an olefin gas stream. However the catalysts must have a low surface area and a specific, narrow, mean port radius. The catalysts which are contemplated in 3,113,980 contain palladium within the range of 0.01 to 5 percent by weight supported on the alumina carrier. However, the carrier must possess a surface area of 5 to 65 square meters per gram in addition to the narrow pore radius distribution. These catalysts of 3,113,980 have: a mean pore radius 100 to 1400 angstrom units, especially 200 to 700 angstrom units; and a surface area 65 to 5 square meters per gram, preferably 30 to 10 square meters per gram.

SUMMARY OF THE INVENTION

In accordance with this invention a catalyst suitable for various hydrogenation reactions, and one which performs particularly well as a selective hydrogenation catalyst under conditions set forth in 3,113,980, is provided. This catalyst also contains palladium in the range of 0.01 to 5 percent by weight of the total catalyst, preferably 0.01 to 0.5. However, the physical properties of the catalysts of this invention represent departure from those of 3,113,-980. The catalysts of this invention are characterized by three desiderata:

The palladiums must be uniformly distributed throughout the catalyst support. It cannot be only on or near the surface thereof;

The major quantity of the pores must have diameters smaller than 800 angstrom units (A.). Preferably more than fifty percent of the pores have diameters smaller than 350 A.;

The alumina must have a surface area above 80 square meters per gram, preferably above 100.

DETAILED DESCRIPTION OF THE INVENTION

Aluminas having these physical surface area and pore properties are available, and such aluminas can be made by the process described in U.S. 2,894,898. However, our preferred alumina is one obtained by calcining alumina containing a balance of crystalline and amorphorous alumina hydrates, prepared according to application Ser. No. 770,783 filed Oct. 25, 1968. This alumina is made by precipitating alumina in hydrous form from an aqueous solution of an alkali metal aluminate by reaction of the aluminate with carbon dioxide under controlled conditions. This alumina has very few pores larger than 800 augstrom units in diameter. Calcination further reduces the pore size so that the majority of pores are in the range below 350 angstrom units in diameter.

As indicated hereinbefore the palladium promoter cannot be on the carrier surface only. It must be uniformly distributed throughout the alumina support. There are two ways of ensuring that the palladium promoter is uniformly distributed throughout the alumina support. One method is by mixing or milling the composition before it is dried. However the preferred method of making certain that the palladium is uniformly distributed involves the selection of the noble metal salt. It has been found, for example, that if $PdCl_2$ is employed palladium will not be distributed throughout the alumina. If alumina pellets are dipped in a solution of $PdCl_2$, the palladium will remain on or near the surface of the alumina carrier. However, if alumina pellets or tablets are dipped in an aqueous solution of $Pd(NH_3)_2Cl_2$ the palladium penetrates the carrier and will be uniformly distributed throughout the tablets after drying.

A preferred method of preparing the catalysts of this invention includes the steps of:

(1) Extruding the particular alumina into the desired size pellets;
(2) Drying the pellets;
(3) Calcining the pellets at 2000° F.;
(4) Determining the volume of water required to completely saturate the carrier, with no excess or free water remaining (usually 100 lbs. of carrier per batch);
(5) For each 100 lbs. of carrier, placing 0.03 to 0.1 lb. of palladium (as ammine chloride) in a container then diluting to the predetermined volume;
(6) Completely submerging the 100 lbs. of carrier in the $Pd(NH_3)_2Cl_2$ solution;
(7) Allowing the catalyst to stand 30 minutes; drying at 250° F.
(8) Calcining the palladium impregnated catalyst at 650° F. to 1200° F.

The effect of the physical properties of the carrier of this invention, and of the uniform distribution of palladium throughout the carrier are best demonstrated by specific examples. These are, of course, for the purpose of illustration only. All of the surface areas were determined by the B.E.T. method and all of the pore sizes were determined by mercury porosimeter with sizes referring to pore diameters.

EXAMPLE 1

Two catalysts were made following the eight steps set forth hereinbefore. In the case of Catalyst A, sufficient $Pd(NH_3)_2Cl_2$ was employed in conjunction with the alumina tablets to give a catalyst containing 0.035 percent palladium. During the submerging process the palladium completely penetrated the carrier tablets. Catalyst B was prepared from an aqueous solution of $PdCl_2$ in a similar manner. This catalyst had 0.035 percent palladium deposited in a layer at its surface. The alumina employed as a carrier for both Catalysts A and B was prepared by carbon dioxide precipitation according to Example 1 of Ser. No. 770,783. It had a surface area of (S.A.) 119 m.$^2$/gm., as determined by the B.E.T. method, and about 90 percent of its pores had diameters in the size range of 0 to 35 A., as determined by mercury porosimeter. In the following table are given results of selective hydrogenations made using Catalyst A and Catalyst B. The gas stream composition, process conditions and results are also given in the table. The hydrogenation was effected by passing the gas stream, which contains hydrogen, through a reactor containing the catalyst particles.

TABLE I.—SELECTIVE HYDROGENATION

| Gas composition: | Percent | Process conditions |
|---|---|---|
| $C_2H_2$ | 0.244 | |
| CO | 0.17 | Space velocity: 5,000 cu. ft./cu. ft./hr. |
| $C_2H_4$ | 39.3 | Pressure: 175 p.s.i.g. |
| $C_3H_6$ | 10.0 | Temperature: As given in table. |
| $H_2$ | 15.4 | |
| $N_2$ | 34.906 | |

| | $Pd(NH_3)_2Cl_2$, $C_2H_2$ out, p.p.m. | Palladium throughout carrier, percent $C_2H_4$ loss |
|---|---|---|
| Catalyst A, inlet temp., ° F.: | | |
| 100 | 1,720 | 0 |
| 120 | 952 | 0 |
| 130 | 829 | 0 |
| 140 | 326 | 0 |
| 150 | 0 | 0 |

| | $PdCl_2$, $C_2H_2$ out, p.p.m. | Palladium layer on surface, percent $C_2H_4$ loss |
|---|---|---|
| Catalyst B, inlet temp., ° F.: | | |
| 100 | 0 | 25.0 |

Table I shows that if the palladium is not uniformly distributed throughout an alumina support, even though the carrier has the physical characteristics essential herein, such a catalyst does not adequately function in the selective hydrogenation of acetylene in the presence of ethylene. As shown in Table I, 25 percent of the ethylene was hydrogenated in addition to acetylene when palladium was on the support surface only. There was, therefore, no need to increase the temperature, since this would lead to hydrogenation of additional quantities of ethylene.

Another comparison of uniformly distributed palladium with that deposited on the surface only is given in Table IA. Catalysts C and D were prepared according to Example 1 using the same alumina source. In Catalyst C the palladium is distributed throughout the carrier whereas it is at the surface of Catalyst D.

TABLE IA.—SELECTIVE HYDROGENTATION

| Gas composition: | Percent | Process conditions |
|---|---|---|
| $C_2H_2$ | 0.19 | |
| CO | 0.17 | Space velocity: 5,000. |
| $C_3H_6$ | 10.0 | Pressure: 175 p.s.i.g. |
| $C_2H_4$ | 38.0 | Temperature: As given. |
| $H_2$ | 16.3 | |
| $N_2$ | 35.34 | |

| Catalyst C Pd throughout | Temp. | $C_2H_2$ in, p.p.m. | $C_2H_2$ out, p.p.m. | $C_2H_4$ loss, percent |
|---|---|---|---|---|
| S.A.=117 | 100 | 1,900 | 225 | 0 |
| Catalyst D Pd on Surface | | | | |
| S.A.=116 | 100 | 3,000 | 0 | 34.7 |

Table IA again shows the advantages of having the palladium distribution throughout the catalyst pellet or tablet. In both instances at least 50 percent of the pores were in the size range of 0 to 350 A., in terms of diameters Both Tables I and IA illustrate the preferred method of obtaining the distribution of palladium throughout the support. However, as indicated previously, palladium distribution, somewhat less effectively, can be achieved by intimate mixing. This is exemplified in Example 2.

EXAMPLE 2

A catalyst was prepared by intimately mixing palladium chloride with alumina prepared by Example 1 of Ser. No. 532,021. This particular alumina had a surface area of 86 m.$^2$ gm., and at least 80 percent of its pores in the range of 0 to 350 A. units in diameter. A final catalyst contained 0.035 percent palladium based on the catalyst. Results of a selective hydrogenation process are given in Table II.

TABLE II.—SELECTIVE HYDROGENATION

| Gas composition: | Percent | Reaction conditions |
|---|---|---|
| $H_2$ | 14 | |
| CO | 0.1 | Space velocity: 5,000. |
| $C_2H_2$ | 775 p.p.m. | Pressure: 150 p.s.i.g. |
| $C_4H_6$ | 0.33 | Temperature: As given. |
| $C_3H_6$ | 15 | |
| $C_2H_4$ | 40 | |
| $N_2$ | Balance | |

| | $C_2H_2$ in, p.p.m. | $C_2H_2$ out, p.p.m. | $C_2H_4$ loss, percent |
|---|---|---|---|
| Temperature: | | | |
| 100 | 775 | 590 | 0 |
| 125 | 775 | 414 | 0 |
| 150 | 775 | 75 | 0.7 |

The effect of palladium orientation has been illustrated by the foregoing examples. Another requisite, along with a surface area above 80 m.$^2$/gm., is the essential catalyst pore structure of at least 50 percent of the pores smaller than 800 A., in terms of diameter. Preferably 50 to 98 percent of the pores have diameters smaller than 350 A. with not more than 5 percent of the pores having diameters larger than 800 A. To show the effect of pore sizes the following is given.

EXAMPLE 3

The catalysts employed in these acetylene hydrogenation runs were both commercially available alumina catalyst bases, impregnated with $Pd(NH_3)_2Cl_2$ according to Example 1, each of the two catalysts (E and F) containing 0.035 percent palladium on a weight basis. Catalyst E and Catalyst F both had surface areas above 80 square meters per gram. However, Catalyst E had only 39 percent of its pores in the 0 to 800 A. size range, the remainder being greater than 800 A. in diameter. In Catalyst F, 84 percent of the pores were in the 0 to 800 A. diameter size range. Results of acetylene hydrogenations using these two catalysts are as follows:

TABLE III.—SELECTIVE HYDROGENATION

| | Percent | Conditions |
|---|---|---|
| Gas composition: | | |
| $C_2H_2$ | 0.21 | |
| CO | 0.12 | |
| $C_2H_4$ | 30.0 | Space velocity. 5,000. |
| $C_3H_6$ | 10.0 | Pressure: 175 p.s.i.g. |
| $H_2$ | 16.3 | |
| $N_2$ | 43.37 | |

| Catalyst: | Temperature, °F. | $C_2H_2$ out | $C_2H_4$ loss |
|---|---|---|---|
| E | 120 up | (1) | (1) |
| F | 130 | 618 | 0 |
| | 145 | 75 | 0 |
| | 150 | 38 | 0 |
| | 162 | 0 | 0 |
| | 170 | 0 | 0 |

[1] Run away temperature due to ethylene hydrogenation.

It is evident from Table III that even though both palladium catalysts have surface areas above 80 square meters per gram, different results nevertheless were obtained in the case of different pore size ranges. With these two catalysts, within the same surface area range, a majority of small pores resulted in good selectivity. However, selectivity was so poor in the case of the catalyst with a majority of large pores, those above 800 A. units in diameter, that ethylene hydrogenation created an undue temperature rise.

Consider now two catalysts G and H, each having the majority of pores in the size range below 800 A. units in diameter, but the catalysts having different surface areas. Catalyst G has a surface area of 42 square meters per gram. Catalyst H has a surface area of 119 square meters per gram. Results of the use of these two catalysts is an acetylene hydrogenation reactor are given in Table IV, the catalysts having been prepared by the procedure for Catalyst A in Example 1, each catalyst having been impregnated throughout with 0.035 percent palladium.

TABLE IV.—SELECTIVE HYDROGENATION

| | Percent | Conditions |
|---|---|---|
| Gas composition: | | |
| $C_2H_2$ | 0.224 | |
| CO | 0.17 | |
| $C_2H_4$ | 39.3 | Space velocity: 5,000. |
| $C_3H_6$ | 10.0 | Pressure: 175 p.s.i.g. |
| $H_2$ | 15.4 | |
| $N_2$ | 34.906 | |

| Catalyst: | Temp., °F. | $C_2H_2$ p.p.m. out | $C_2H_4$ loss, percent |
|---|---|---|---|
| G | 115 | 0 | 40.4 |
| H | 100 | 225 | 0 |
| | 170 | 0 | 0 |

The data again illustrate the advantages of a high surface area in combination with a majority of small pores, small pores being those having diameters in the range of 0 to 800 A., desirably below 350 A., and high surface areas being 80 to 300, preferably 90 to 200, square meters per gram.

In practicing the present method, a gas stream of ethylene, containing acetylene to be removed therefrom is admixed with a gas stream of hydrogen, if an excess of hydrogen is not already present in the ethylene-acetylene gas, and the resulting mixture is passed into contact with one of the catalysts herein described. The gas mixture may contain other materials, such as hydrocarbons, normally incident to the preparation of the ethylene-containing gas, as well as nitrogen, carbon dioxide, small proportions of air, and water vapor. The gas stream should be free of sulfur-containing compounds and, if necessary, a known sulfur absorbent, such as an alkaline carbonate solution containing arsenates or the equivalent, can be employed to remove sulfur compounds from the feed mixture before contacting that mixture with the hydrogenation catalyst.

It is desired to employ the catalysts herein contemplated for the hydrogenation of acetylene prior to fractionation of the acetylene stream. In this instance a large excess of hydrogen is present. In other instances, the proportion of hydrogen which should be present in, or added to, the ethylene gas is at least that proportion necessary to hydrogenate all of the acetylene present in the mixture, i.e., one mol or more of hydrogen per mol of acetylene. An excess of hydrogen over that theoretically necessary to react with all of the acetylene is usually required in practical operation in any case.

As indicated the selective hydrogenation of acetylene from an ethylene stream using palladium supported on activated alumina is not new. The known reaction conditions are contemplated herein. To catalyze the hydrogenation of acetylenes, temperatures of 100° F. to 400° F., pressures of 15 to 1000 pounds per square inch gauge, and space velocities of 500 to 7000 volumes of gas per volume of catalyst per hour and higher are employed. Normally the gas stream will contain less than two percent acetylene.

This invention thus provides a catalyst selective for the hydrogenation of acetylene which compares favorably with those now in wide use. As an illustration a comparison of Catalyst A of this invention with a highly commercial selective hydrogenation catalyst, Catalyst J, is given under two sets of conditions in Examples 4 and 5.

EXAMPLE 4

| Feed compositions | Percent volume | Catalysts used | Process conditions |
|---|---|---|---|
| Hydrogen | 13.9 | | |
| Acetylene | 0.24 | | |
| Ethylene | 36.0 | Catalyst A | Reactor pressure: 175 p.s.i.g. |
| Propylene | 13.0 | Catalyst J | Space velocity: 5,500 vol./hr./vol. |
| Meth. acet. | 0.073 | | |
| Butadiene | 0.156 | | |
| Nitrogen | Balance | | |

| | Temperatures, °F. | | Acetylene in effluent by volume, p.p.m. | Ethylene loss, percent by volume | Polymer in product, percent by volume[1] |
|---|---|---|---|---|---|
| | Inlet | Exit | | | |
| Catalyst: | | | | | |
| A | 110 | 112 | 1,100 | 0 | 0.0043 |
| | 130 | 135 | 562 | 0 | 0.0051 |
| | 150 | 162 | 79 | 0.28 | 0.0140 |
| | 170 | 230 | (2) | 27.5 | |
| J | 110 | 114 | 1,224 | 0 | 0.0040 |
| | 130 | 137 | 468 | 0 | 0.0079 |
| | 150 | 160 | 55 | 0.19 | 0.0194 |
| | 170 | 200 | (2) | 25.0 | |

[1] $C_4$ plus material in the reactor effluent.
[2] Runaway.

EXAMPLE 5

| Feed compositions | Percent volume | Catalysts used | Process conditions |
|---|---|---|---|
| Hydrogen | 13.6 | | |
| Acetylene | [1] 366 | | |
| Ethylene | 36.3 | Catalyst A | Reactor pressure: 500 p.s.i.g./ |
| Propylene | 13.0 | Catalyst J | Space velocity: 5,500 vol./hr. vol. |
| Meth. acet. | 0.043 | | |
| Butadiene | 0.06 | | |
| Nitrogen | Balance | | |

| | Temperatures, °F. | | Acetylene in effluent by volume, p.p.m. | Ethylene loss, percent by volume | Polymer in product, percent by volume [2] |
|---|---|---|---|---|---|
| | Inlet | Exit | | | |
| Catalyst: | | | | | |
| A | 110 | 113 | 113 | 0 | 0.0048 |
| | 130 | 135 | 39 | 0 | 0.0092 |
| | 150 | 155 | 5.1 | 0 | 0.0180 |
| | 170 | 235 | ([3]) | 33.0 | |
| J | 110 | 115 | 120 | 0 | 0.0055 |
| | 130 | 136 | 45 | 0 | 0.0102 |
| | 150 | 160 | 7.2 | 0 | 0.0190 |
| | 170 | 220 | ([3]) | 39.0 | |

[1] P.p.m.
[2] C4 plus material in the reactor effluent.
[3] Runaway.

While the preferred carrier for the catalyst contemplated herein is alumina, a smaller quantity, not more than 30 percent of a kaolinitic clay can be mixed with the alumina. A comparison of a clay modified catalyst, Catalyst K, with Catalysts A and J is given in Example 6. Catalyst K contains 30 percent Old Hickory ball clay (No. 5) in admixture with the alumina used in Catalyst A. The catalyst has a surface area of 86 square meters per gram and about 68 percent of its pores in the 0 to 800 A. diameter range.

EXAMPLE 6

| Feed compositions | Percent volume | Catalysts used | Process conditions |
|---|---|---|---|
| Hydrogen | 13.0 | | |
| Acetylene | 0.24 | | |
| Ethylene | 36.0 | Catalyst K | Reactor pressure: 500 p.s.i.g. |
| Propylene | 13.0 | Catalyst A | Space velocity: 5,500 vol./hr./vol. |
| Meth. acet. | 0.073 | Catalyst J | |
| Butadiene | 0.156 | | |
| Nitrogen | Balance | | |

| | Temperatures, °F. | | Acetylene in effluent by volume, p.p.m. | Ethylene loss, percent by volume | Polymer in product, percent by volume [1] |
|---|---|---|---|---|---|
| | Inlet | Exit | | | |
| Catalyst: | | | | | |
| K | 110 | 116 | 1,038 | 0 | 0.0034 |
| | 130 | 139 | 449 | 0 | 0.0073 |
| | 150 | 161 | 71 | 0 | 0.0141 |
| A | 110 | 120 | 827 | 0 | 0.0022 |
| | 130 | 135 | 212 | 0 | 0.0051 |
| | 150 | 167 | 7.6 | 0.35 | 0.0126 |
| | 170 | 265 | ([2]) | 29.2 | |
| J | 110 | 119 | 792 | 0 | 0.0018 |
| | 130 | 137 | 157 | 0 | 0.0048 |
| | 150 | 163 | 2.5 | 0.49 | 0.0125 |
| | 170 | 250 | ([2]) | 32.0 | |

[1] C4 plus material in the reactor effluent.
[2] Runaway.

The foregoing examples and data show that an outstanding selective hydrogenation catalyst results from the practice of this invention. The kaolinitic clay, if used in the compositions of this invention, is a material resulting from the natural weathering of feldspar and includes both primary kaolins such as china clay or secondary kaolins such as ball clay. Such clays are unique materials found in large quantities in nature. Kaolinitic clays are of a natural plastic nature having remarkably high uniformity in their properties and are composed of silicon, oxygen and hydrogen according to the general formula $Al_2O_3 2SiO_3 2H_2O$. They are sometimes referred to as comprising aluminum silicates, but are probably composed of aluminosilicic acid. This clay modification and other ramifications will occur to those skilled in the art. Such variations are deemed to be within the scope of this invention.

What is claimed is:

1. In the process for the selective hydrogenation of acetylenes in gases containing olefins wherein to remove the acetylene from the stream it is reacted with hydrogen at a temperature of 100° F. to 400° F. and a pressure of 15 to 1000 pounds per square inch gauge, the improvement whereby the acetylene is hydrogenated with substantially no hydrogenation of the olefin which comprises under said reaction conditions reacting the gases in contact with a palladium activated, predominantly alumina, hydrogenation catalyst of improved selectivity having between 0.01 and 5 percent by weight palladium on a dry basis uniformly distributed throughout a support containing at least seventy percent alumina, any remainder being clay, the support having a surface area of 80 to 300 square meters per gram, with at least 50 percent of its pores having diameters in the size range below 800 angstrom units.

2. The process of claim 1 wherein the hydrogenation catalyst has 50 to 98 percent of its pores having pore diameters in the range of 0 to 350 A., wherein only 1 to 5 percent of the pores have a pore diameter larger than 800 A., and wherein its surface area is in the range of 90 through 200 square meters per gram.

3. The process of claim 1 wherein the catalyst contains 30 percent kaolin.

4. The process of claim 1 wherein the catalyst is devoid of clay.

5. The process of claim 1 wherein the catalyst is impregnated with 0.01 to 0.5 percent palladium by weight based on the catalyst.

6. As a catalyst for selectively hydrogenating acetylenes in gases containing olefins with virtually no hydrogenation of the olefin, a palladium activated, predominantly alumina, hydrogenation catalyst of improved selectivity having between 0.01 and 5 percent by weight palladium on a dry basis uniformly distributed throughout a support containing at least seventy percent alumina, any remainder being clay, the support having a surface area of 80 to 300 square meters per gram, with at least 50 percent of its pores having pore diameters in the size range below 800 angstrom units.

References Cited

UNITED STATES PATENTS

| 2,840,531 | 6/1958 | Fleming et al. | 260—677 |
| 3,412,169 | 11/1968 | Clark | 260—677 |
| 3,459,657 | 8/1969 | Kronig et al. | 260—677 |

HERBERT LEVINE, Primary Examiner

U.S. Cl. X.R.

252—455, 466